United States Patent Office 3,350,886
Patented Nov. 7, 1967

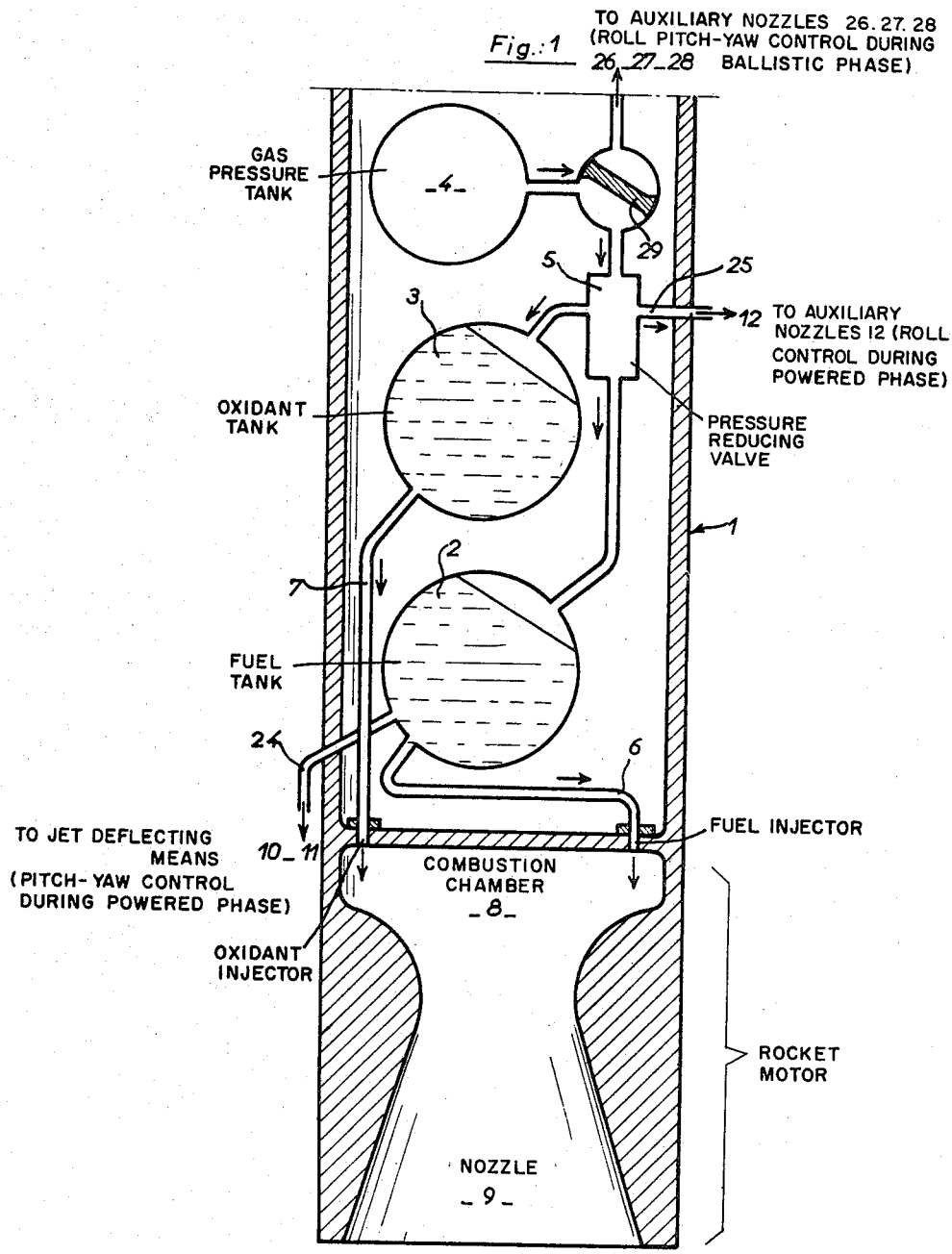

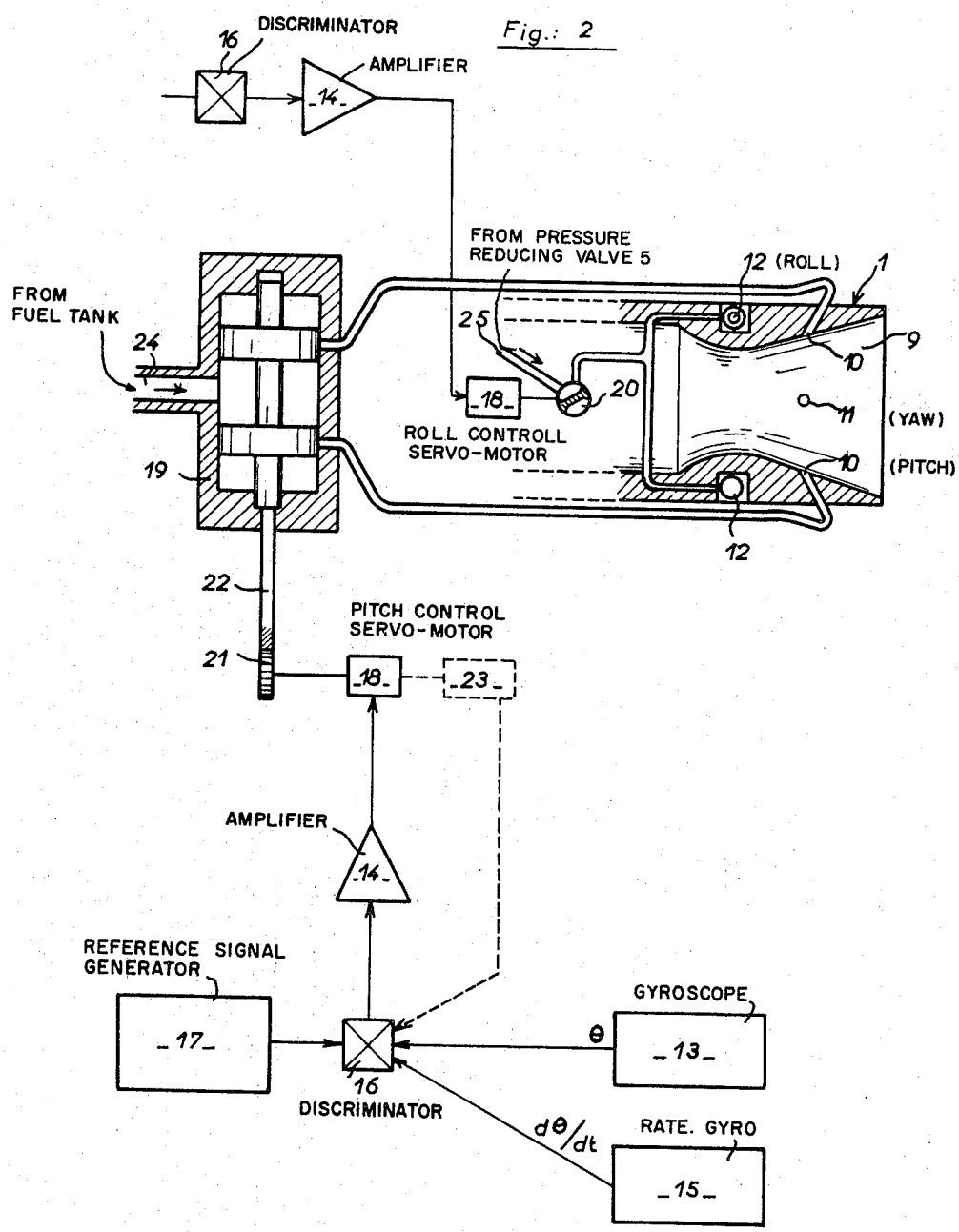

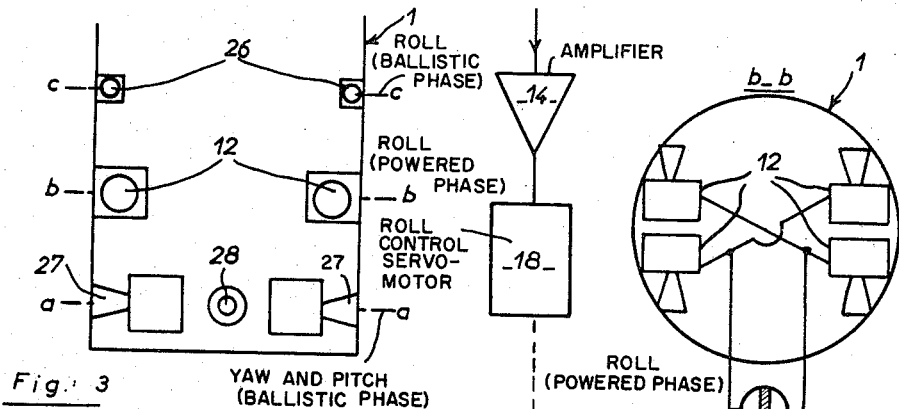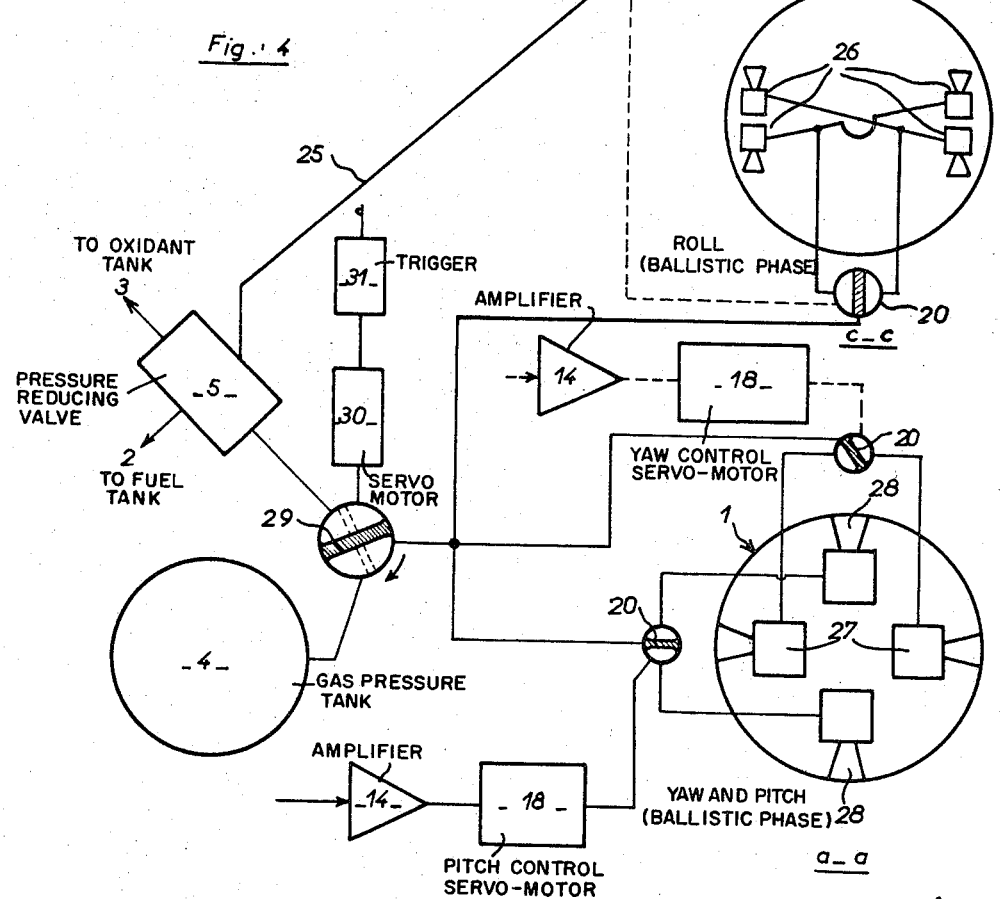

3,350,886
PROCESS AND DEVICE FOR STABILIZING AND GUIDING A ROCKET-PROPELLED BALLISTIC VEHICLE
Roger Adrien Feraud, Bourg-la-Reine, and Jean Paul Joseph Jardinier, Vitry-sur-Seine, France, assignors to Societe Nationale d'Etude et de Construction de Moteurs d'Aviation, Paris, France
Filed Oct. 21, 1965, Ser. No. 500,078
Claims priority, application France, Oct. 22, 1964, 992,324
9 Claims. (Cl. 60—204)

ABSTRACT OF THE DISCLOSURE

The stabilization and guidance of rocket-propelled vehicles operating along a powered and an unpowered or ballistic phases of flight are effected by means of two distinct groups of generators of torques about the three main axes of the vehicle, one of the groups being employed solely during the powered flight phase and the other solely during the ballistic flight phase, these generators comprising suitably oriented nozzles which either act independently by themselves through thrust produced thereby with a proper leverage, or exert a deflecting action on the main rocket jet to correspondingly produce a moment.

The present invention has the object of providing a device that will ensure the stabilisation in attitude or the guidance of a sounding rocket or analogous vehicle both during the powered flight phase and during the unpowered or ballistic phase of the vehicle.

The aim of high-performance sounding rockets is to carry out scientific measurements outside the earth's atmosphere. It is frequently necessary to stabilise such a rocket around the centre of gravity in relation to a reference datum determined during powered flight and ballistic flight. In the course of the powered flight phase corrective moments are generally created by deflecting the main jet stream by injection, whether of liquid or gas; this deflection is controlled by data from an attitude detector (a gyroscope, for example). At the termination of the powered flight phase the vehicle is left on its own during the ballistic phase and it is necessary for it to have a considerable margin of stability so that the initial orientation or attitude of the vehicle should not be excessively disturbed.

It must, however, be emphasized that the powered flight phase is relatively short in comparison with the ballistic phase and that it is particularly during the latter phase that measurements or observations are carried out. If these require a precise orientation of the vehicle's payload in relation to a reference system, it may be of major importance to stabilise the vehicle artificially during the ballistic phase.

The present invention makes use of the fact that there is already available a stabilising device, for example involving the deflection of the jet stream, by utilising part of the mechanism of this device to carry out stabilisation and guidance of the vehicle during the ballistic phase.

According to the present invention, the stabilisation and guidance of the vehicle are effected during the course of its powered flight phase and during its ballistic phase, by the selective operation of one or other of two distinct groups of torque generators, the torques being about three main axes of the vehicle, one of the groups being utilised solely during the powered flight phase and the other solely during the ballistic phase. The torque generators may comprise small auxiliary nozzles appropriately orientated and positioned to produce a predetermined thrust with a given leverage. Alternatively, during powered flight, the required torque may be obtained by proper deflection of the main rocket jet.

In one embodiment of the invention the various auxiliary nozzles or the means for deflection are supplied with compressed gas from the usual reservoir for pressurising the vehicle's propellants.

The outlet means for deflecting the propulsive jet stream may be supplied by taking a small proportion of pressurized propellant.

In the drawings:
FIGURE 1 is a diagrammatic longitudinal section through a vehicle embodying the present invention,
FIGURE 2 illustrates diagrammatically the vehicle's stabilisation and guidance control,
FIGURE 3 is a highly diagrammatic representation of the vehicle's mechanism for stabilisation or guidance by reaction jet means, and
FIGURE 4 illustrates diagrammatically the control arrangement for the mechanism shown in FIGURE 3.

In the following description consideration is given, by way of example, to a sounding rocket capable of carrying a payload of 100 kg. to an altitude of 300 km. In addition, in order to make clear the working of the stabilisation device during the powered flight and ballistic phases, the conventional example of a liquid propellant rocket employing a fuel and an oxidant has been chosen.

FIGURE 1 shows a rocket 1 that includes a liquid fuel reservoir 2 and a liquid oxidizer reservoir 3, the two liquids being pressurised by a compressed gas contained in a third reservoir 4 and conveyed towards the liquid reservoirs 2, 3 with the interposition of a pressure-reducing valve 5. The liquid propellants are thus supplied under pressure, by way of pipes 6, 7, into the rocket's combustion chamber 8 which opens out into a jet nozzle 9.

In the periphery of the jet nozzle 9 there are open radial outlet means 10, 11 (FIGURE 2) to the total number of four and displaced at an angle of 90° from each other, each outlet means producing, when supplied with pressurised fluid, a deflecting action on the main jet stream issuing from the jet nozzle 9, and consequently a pitching or yawing moment. Roll control is effected with the assistance of two pairs of auxiliary nozzles 12 opening to the outside in directions that are tangentially opposed.

The stabilisation has the aim of maintaining the vehicle close to a chosen vertical position and of preventing any disturbing movement about the centre of gravity. When the vehicle presents an angular deviation $\theta$ in relation to its reference position, said deviation is measured by an attitude detector 13 which may be a gyroscope and which transmits an electric signal which is amplified at 14 and effects control to bring about a guidance movement and return the vehicle to its initial attitude.

An attitude variation rate detector 15, which may be a rategyro, is intended to provide a signal for damping angular movements, so as to ensure stability.

The attitude variation signals $\theta$ and those for attitude variation rate $d\theta/dt$ transmitted by the detectors 13 and 15 are applied to a discriminator 16, as too are signals originating in a guidance reference 17, before amplification at 14. The resultant amplified signal controls a suitable electric servo-motor 18 which effects the supply of fluid to the outlet means 10 or 11 or desired auxiliary nozzle 12 by controlling a distributor 19 or a rotary valve 20.

In FIGURE 2 there is a purely diagrammatic representation of a mechanism for actuating the distributor 19 by a pinion 21 and a rack 22. The electric servo-motor 18 may be controlled in position, in a conventional manner, by a synchro-detector 23 shown in broken lines. The distributor 19, when occupying its mean position of repose as shown in the drawing, does not permit flow and there is no deflection. A displacement of the distributor in one direction or the other frees a passageway for the flow of pressurised fluid supplied to an inlet 24 and intended for injection into the propulsive jet stream through one of the outlet means 10. Therefore, the greater the displacement of the distributor 19, the greater the deflection occurring. When the distributor 19 is displaced in the opposite direction a deflection in the opposite direction is obtained.

The pressurised fluid intended to supply the outlet means 10, 11 for pitch and yaw stabilisation is propellant tapped by the pipe 24 from the fuel reservoir 2 (the tapping could alternatively be effected from the oxidizer reservoir 3). The pressurized fluid intended for supplying the auxiliary nozzles 12 for roll stabilisation is compressed gas tapped from the reservoir 4 via the pressure-reducing valve 5 and a pipe 25 (FIGURE 1) which terminates at the valve 20 (FIGURE 2) whose function it is to distribute the gas to one pair of nozzles 12 or the other according to the direction of torque required. The valve 20 may be continuous, that is, it can proportion the thrust according to its position. It may alternatively be of the "On-Off" type, and in this event a thrust that is nil or consant in one nozzle or the other will be obtained. The choice of valve depends on the stabilisation arrangement chosen.

It is in this manner that the vehicle's stabilisation and guidance about its three main axes during the powered flight phase is obtained: the pitch and yaw control is effected by deflecting the propulsive jet stream issuing from the jet nozzle 9 by means of outlet means 10, 11, whereas the roll control is effected by the reaction effect brought about through the auxiliary nozzles 12, the outlets 10, 11 being supplied with liquid propellant pressurised by the compressed gas contained in the reservoir 4 (FIGURE 1) and the auxiliary nozzles 12 being supplied with the same gas directly.

After engine cut-off, the product continues its flight proceeding along a ballistic trajectory in the course of which it is necessary continually to ensure stabilisation and, if so required, re-orientation about the three main axes. Naturally, given the absence of a propulsive jet stream along the jet nozzle 9, the deflecting outlet means 10, 11 will then be inoperative. On the other hand, the nozzles 12 which open to the outside and which act by a reaction effect can continue to serve for roll control; it should, however, be noted that, since the rocket at the end of its powered flight phase is at a very high altitude, atmospheric disturbances are minimal, and relatively small angular accelerations are sufficient, which means that small size nozzles may be used, especially if they are located at the greatest possible distance from the vehicle's centre of gravity.

With this effect in view, in FIGURES 3 and 4 there are shown diagrammatically nozzles 26 for controlling roll during the ballistic phase that are smaller than the nozzles 12 employed during the powered flight phase. As regards pitch and yaw control during the ballistic phase, this is ensured by substituting for the deflecting outlet means 10, 11 of the powered flight phase, orthogonal and opposed nozzles 27, 28 opening to the outside in radial directions.

This separation into two distinct groups of the stabilisation and guidance mechanisms, the groups functioning during the powered flight and ballistic phases respectively, constitutes a feature characterising the present invention.

The supply of pressurized fluid to said group active during the ballistic phase may likewise be effected by compressed gas contained in the reservoir 4 (FIGURE 1). A two-position valve 29 makes it possible to switch the supply of gas either to the items 10, 11, 12 associated with the powered flight phase or to the items 26, 27, 28 associated with the ballistic phase. The operation of the valve 29 can be effected (FIGURE 4) by a servo-motor 30 controlled by trigger device 31 actuated by an engine cut-off device. The actuating signal may be effected, for example, by an automatic timing device adjusted in accordance with the duration of the powered flight phase or by any other arrangement, such as the drop in pressure in the combustion chamber 8 when the propellant reservoirs 2, 3 are empty.

The pressure of the compressed gas in the reservoir 4 that prevailed when the rocket engine was first started diminishes until the instant of cut-off, but, bearing in mind the altitude reached and the rarefied environmental atmosphere, considerable velocities can be achieved in gases emitted from the nozzles 26, 27, 28 with a residual pressure that is relatively small.

The nozzles 26, 27, 28 are controlled, as in the previous instance, by valves 20 (FIGURE 4), whether of the continuous or the On-Off type, actuated by servomotors or electro-magnets 18. These latter are controlled electrically by amplifiers 14 whose inputs receive signals relating to guidance and attitude detection.

It will be seen that the valve 29 is intended to prevent the passage of gas towards the liquid reservoirs 2, 3 and the roll control nozzles 12 associated with the powered flight phase. It also allows the nozzles 26, 27, 28 of the ballistic phase to be supplied with fluid when signals in respect of guidance and stabilisation are transmitted to the servo-motors controlling the distribution valves.

In brief, according to the present invention the vehicle's stabilisation or guidance is arranged in the following manner:

(1) In powered flight, the guidance torques in respect of pitch and yaw are provided by a liquid injection (for example, of propellant) which deflects the propulsive jet stream before it emerges from the jet nozzle 9. The deflecting outlet means 10, 11 are located on the diverging section of the jet nozzle 9 in the vicinity of the vertical diametral plan (pitch) or the horizontal one (yaw). Roll guidance torques are provided by the emission of compressed gas 4 through the auxiliary nozzles 12.

(2) In ballistic flight, the three kinds of guidance torques are provided by the residual pressure of the compressed gas 4 supplied to the horizontal radial nozzles 27 (yaw) or the vertical radial nozzles 28 (pitch) or the tangential nozzles 26 (roll). The nozzles 26 for roll in respect of ballistic flight are of smaller dimensions than the nozzles 12 for roll in respect of powered flight.

It is clear that, to supply the outlets or nozzles directly or indirectly, recourse may be had to a source of pressurised fluid other than the compressed gas reservoir 4, for example a chemical gas generator.

We claim:

1. A method for controlling and stabilizing a sounding rocket or like missile having a jet propulsion nozzle designed to produce a propelling jet for said missile, a first set of a plurality of nozzle means designed to produce reaction torques about the roll, pitch and yaw axes of said missile, and a second set of a plurality of nozzle means separate and distinct from the nozzle means of said first set but also designed to produce reaction torques about said axes, said method comprising the steps of activating said jet propulsion nozzle to cause said missile to travel along a powered course, leaving inactive said jet propulsion nozzle to cause said missile to travel along an unpowered course, selectively activating the nozzle means belonging to said first set while leaving inactive the nozzle means belonging to said second set during said powered course of said missile, and selectively activating the nozzle means belonging to said second set while leaving inactive the nozzle means belonging to said first set during said unpowered course.

2. Method as claimed in claim 1, wherein pitch and yaw control of said missile is effected, during said powered course by discharging auxiliary jets into said propulsion nozzle to deflect said propelling jet and, during said unpowered course, by discharging auxiliary jets outside said missile.

3. Method as claimed in claim 1, wherein roll control of said missile is effected by discharging auxiliary jets outside said missile at one location thereof during said powered course and at another location thereof during said unpowered course.

4. Method as claimed in claim 3, wherein the discharge flow of said jets during said powered course is substantially larger than the discharge flow of said jets during said unpowered course.

5. A sounding rocket or like missile having a jet propulsion nozzle, a system for consecutively activating said jet propulsion nozzle to produce a propelling jet whereby to cause said missile to travel along a powered course and leaving inactive said jet propulsion nozzle with no propelling jet whereby to cause said missile to travel along an unpowered course, and a set of a plurality of nozzle means selectively activatable to produce reaction torques about the roll, pitch and yaw axes of said missile, wherein the improvement comprises a further set of a plurality of nozzle means separate and distinct from the nozzle means of the first mentioned set but also selectively activatable to produce reaction torques about said axes, and means for selectively activating the nozzle means belonging to said first mentioned set while leaving inactive the nozzle means belonging to said further set during one of said courses of said missile, and activating the nozzle means belonging to said further set while leaving inactive the nozzle means belonging to said first mentioned set during the other of said courses of said missile.

6. Missile as claimed in claim 5, wherein the nozzle means activatable during said powered course comprise pitch and yaw control nozzles opening into said jet propulsion nozzle and adapted to cause deflection of said propelling jet, and roll control nozzles opening outside said missile, and the nozzle means activatable during said unpowered course comprise pitch, yaw and roll control nozzles separate and distinct from the previously mentioned nozzles and all opening outside said missile.

7. Missile as claimed in claim 6, wherein the roll control nozzles activatable during said powered course are substantially larger than the roll control nozzles activatable during said unpowered course.

8. Missile as claimed in claim 5, further comprising a common source of pressurized fluid for activating the nozzle means of both of said sets, a first piping system between said source and the nozzle means belonging to one of said sets, a second piping system between said source and the nozzle means belonging to the other of said sets, and switching means in said piping systems for selectively switching on said first piping system and switching off said second piping system, and conversely.

9. Missile as claimed in claim 8, wherein said source of pressurized fluid is a liquid propellant pressurizer, compressed gas reservoir, and said switching means comprise a three-way valve having an input end connected with said reservoir and two output ends connected respectively with said first and second piping systems.

References Cited
UNITED STATES PATENTS

| | | | |
|---|---|---|---|
| 2,671,312 | 3/1954 | Roy | 60—39.48 X |
| 2,943,821 | 7/1960 | Wetherbee | 60—231 X |
| 3,015,210 | 1/1962 | Williamson et al. | 60—39.48 X |
| 3,115,887 | 12/1963 | McCorkle | 60—224 X |
| 3,134,225 | 5/1964 | Pennington | 60—231 |
| 3,170,290 | 2/1965 | Webb | 60—39.84 X |
| 3,190,069 | 6/1965 | Gorbaty | 60—224 |
| 3,213,611 | 10/1965 | Vanderburgh | 60—229 |
| 3,230,706 | 1/1966 | Tripp | 60—224 |

CARLTON R. CROYLE, *Primary Examiner.*